M. CAOUETTE.
FIRE ESCAPE.
APPLICATION FILED AUG. 24, 1918.
1,308,480.
Patented July 1, 1919.
2 SHEETS—SHEET 2.
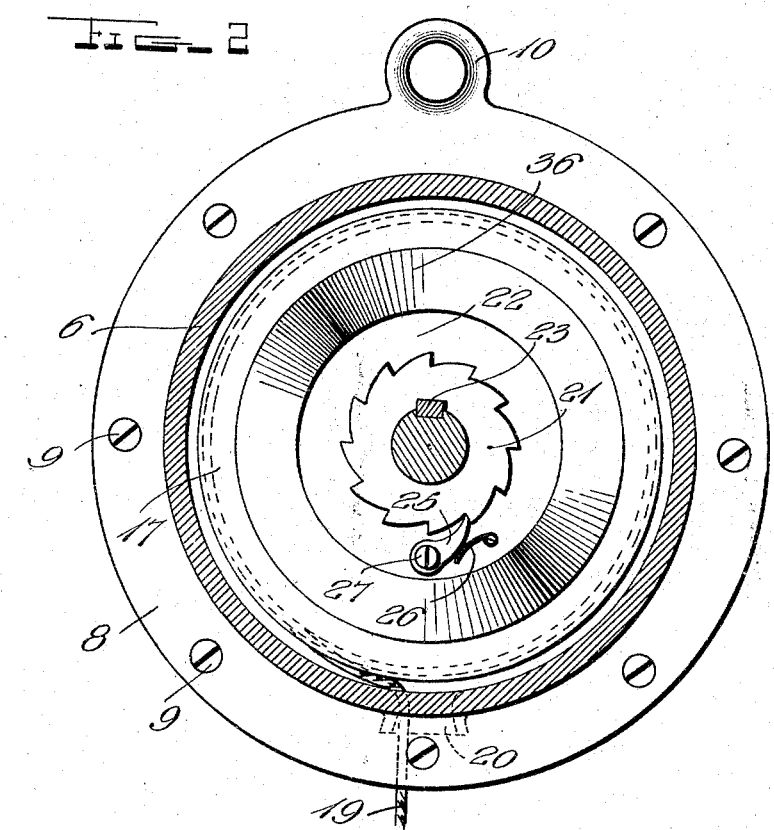
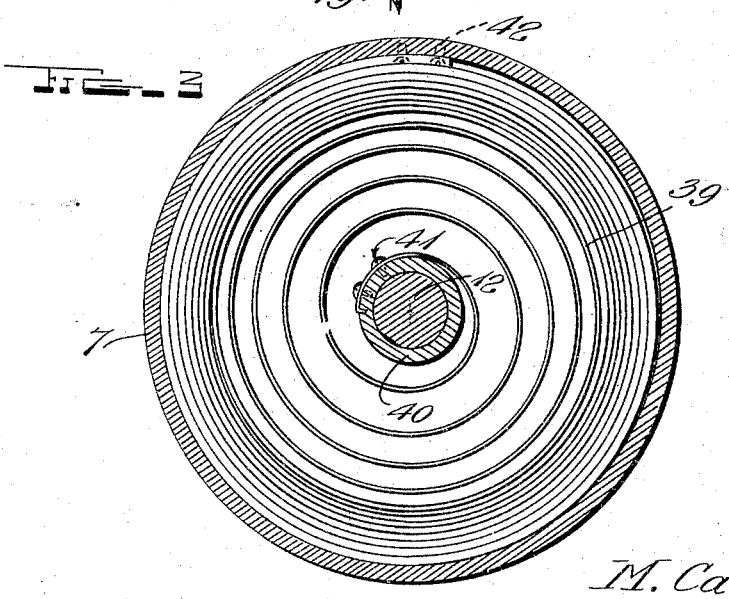
Inventor
M. Caouette
By
C. H. Parker
Attorney

UNITED STATES PATENT OFFICE.

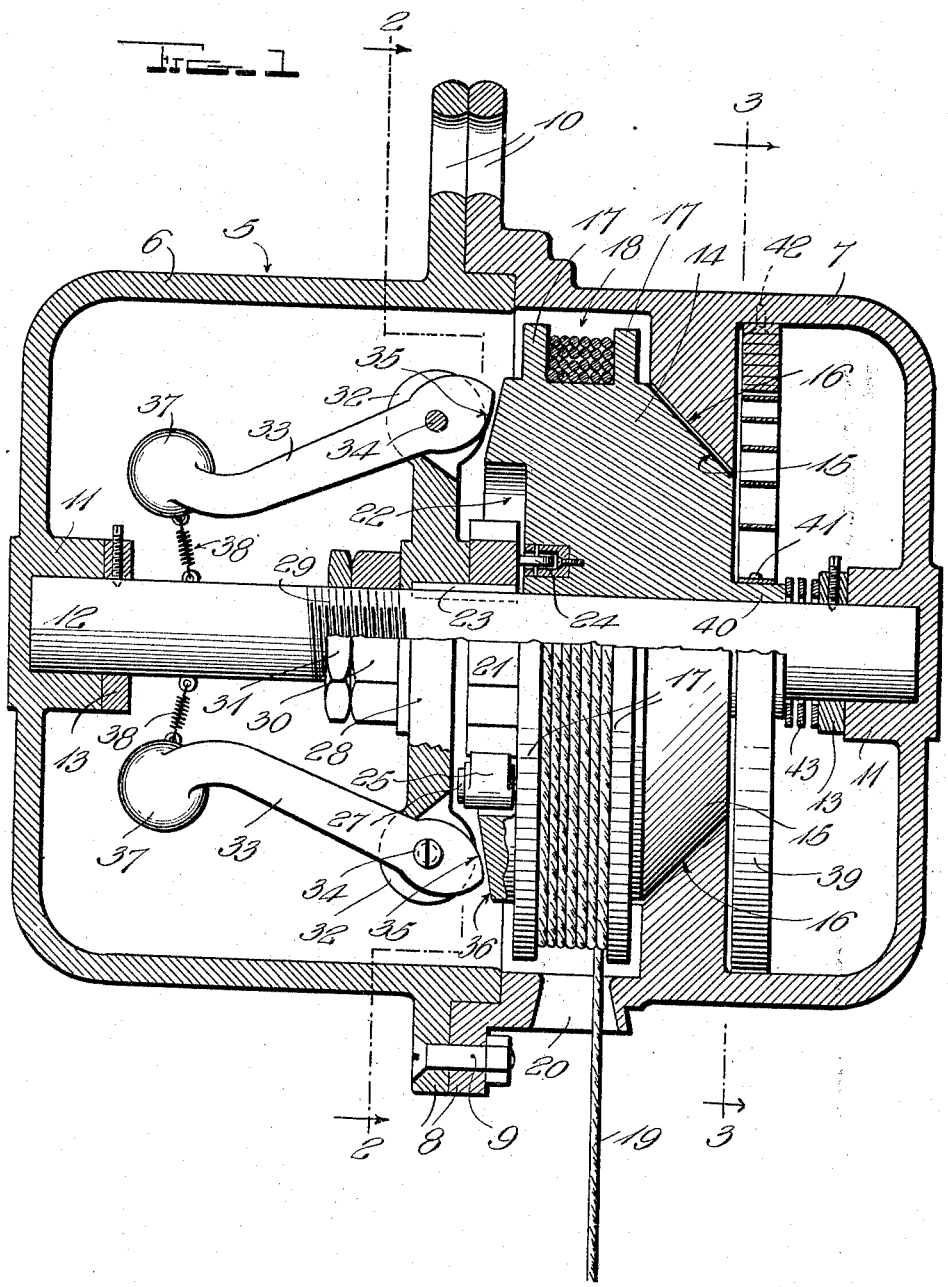

MARCAL CAOUETTE, OF CLINTON, NEW YORK.

FIRE-ESCAPE.

1,308,480.  Specification of Letters Patent.  Patented July 1, 1919.

Application filed August 24, 1918. Serial No. 251,302.

*To all whom it may concern:*

Be it known that I, MARCAL CAOUETTE, a subject of the King of England, residing at Clinton, in the county of Oneida and State of New York, have invented certain new and useful Improvements in Fire-Escapes, of which the following is a specification.

My invention relates to improvements in fire escapes, embodying centrifugally operated means, for controlling the descent of the operator.

An important object of the invention is to provide a fire escape of the above mentioned character, the parts of which are arranged in a highly compact manner.

A further object of the invention is to provide apparatus of the above mentioned character, which is simple in construction, inexpensive to manufacture, and wholly automatic in operation.

A further object of the invention is a spring means to return the winding drum to the starting position, such spring gradually increasing in stiffness, in proportion to the added weight of the cable, as it is unwound.

Other objects and advantages of the invention will be apparent during the course of the following description.

In the accompanying drawings forming a part of this specification and in which like numerals are employed to designate like parts throughout the same, Figure 1 is a central vertical longitudinal sectional view through apparatus embodying my invention, Fig. 2 is a transverse sectional view taken on line 2—2 of Fig. 1, and, Fig. 3 is a similar view taken on line 3—3 of Fig. 1.

In the drawings, wherein for the purpose of illustration is shown a preferred embodiment of my invention, the numeral 5 designates a housing or casing, preferably formed in two parts 6 and 7, having flanges 8 secured together by bolts 9.

At their top, the casing sections 6 and 7 are provided with eyes 10, for engagement with a suspension hook or the like.

The casing sections 6 and 7 are provided upon their ends and preferably centrally thereof, with interior bearings 11, rotatably receiving a horizontal shaft 12. Rings 13 are rigidly secured to the end portions of the shaft 12 and slidably contact with the bearings 11, as shown.

Rotatably mounted upon the shaft 12 is a drum 14, having a cone face 15, to contact with a cone face 16, included in a friction clutch device. The cone face 16 is rigidly secured to the casing section 7, but the invention is in no sense restricted to the particular arrangement of the cone face 16, nor the particular type of friction clutch device.

The drum 14 is provided upon its periphery with a pair of spaced annular flanges 17, forming an annular recess 18, for the reception of a cable 19, or other flexible element, which is wound upon the drum, with one end thereof secured to the drum, by any suitable means. The cable 19 passes downwardly through an opening 20 formed in the casing section 7.

When the cable 19 is being unwound, the drum 14 is rotated counter-clockwise, as viewed from Fig. 2, and a ratchet wheel 21 is disposed within a recess 22, formed in the end of the drum 14. The teeth of the ratchet wheel 21 face clockwise, as shown in Fig. 2. The ratchet wheel 21 is rigidly secured to the shaft 12, for rotation therewith, by means of a key 23. A suitable number of rollers 24, are carried by the drum 14, and contact with the face of the ratchet wheel 21, as shown. A pawl 25 is arranged to contact with the ratchet wheel 21, and is urged into engagement therewith by means of a spring 26. The pawl 25 is pivoted upon the drum 14, as shown at 27.

A centrifugal governor is provided to move the cone face 15 into frictional contact with the cone face 16, comprising a plate support 28, apertured for the reception of the shaft 12, and preferably rigidly secured thereto for rotation therewith, by means of the key 23. A portion of the shaft 12 is screw-threaded as shown at 29, and an adjusting nut 30 engages this screw-threaded portion and is adapted to contact with the support plate 28. A lock nut 31 engages the screw-threaded portion 29 for coaction with the adjusting nut 30. The function of the adjusting nut is to provide means whereby the support plate 28 can be slightly longitudinally adjusted with respect to the shaft 12. The support plate 28 is provided with ears or knuckles 32, having pivotal connection with arms 33, as shown at 34. These arms have cam faces 35, to contact with inclined faces 36, formed upon the end of the drum 14. At their free ends, the arms 33 are provided with balls or weights 37. Retractile coil springs 38 are secured to these balls and to the shaft 12, as shown.

Means are provided to turn the drum 14, for rewinding the cable 19, comprising a torsional coil spring 39. The inner end of this spring is attached to a tubular extension 40, of the drum 14, as shown at 41, while its outer end is attached to the casing section 7, as shown at 42. As more clearly shown in Fig. 3, the material of the spring 39 increases in thickness gradually from its inner end to its outer end, thereby gradually increasing in strength or stiffness toward its outer end. This construction is provided so that the spring will gradually increase in strength, as it is unwound, in proportion to the increase in weight of the cable 19, which is unwound.

A compressible coil spring 43 surrounds a portion of the shaft 12 and is interposed between the tubular extension 40 and the ring 13, and serves to shift the drum 14 to the left, breaking contact between the faces 15 and 16, when the centrifugal governor is not operating, and the drum is being rewound by the spring.

The operation of the apparatus is as follows:

The casing 5 may be suspended by any suitable means, to a suitable support. As an illustration of such means, a suspension hook or the like (not shown) may be passed into the eyes 10. The operator secures himself to the cable 19 by suitable means, as is well known, and when his weight is placed upon the cable the drum 14 will start to rotate, to permit of the unwinding of the cable. The rotation of the drum 14 is counter-clockwise in Fig. 2, and the drum will revolve the pawl 25 with it, which causes the ratchet wheel 21 and centrifugal governor to rotate in the same direction. When the speed of the revolving drum 14 exceeds a predetermined limit, the governor arms 33 will move outwardly, and the cam-faces 35 contact with the inclined face 36, thereby shifting the drum 14 to the right. The face 15 will now contact with the face 16, thus retarding the rotation of the drum and returning the same to the proper speed. While the drum is rotated to unwind the cable, the spring 39 is being wound up. When the operator reaches a landing place and disconnects himself from the cable, the spring 39 will rotate the drum in an opposite direction, to wind up the cable. The pawl 25 will now trip upon the teeth of the ratchet wheel whereby the centrifugal governor is idle, the spring 43 shifting the drum 14 to the left, whereby faces 15 and 16 do not contact. A peculiar advantage is obtained by the use of my specific type of torsional spring 39. By having the spring gradually increase in thickness from its inner end to its outer end, the same gradually increases in strength or stiffness in the same direction, whereby it is capable of properly winding up the cable, which increases in weight as it is unwound.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a fire escape of the character described, a support, a rotatable shaft carried thereby, a clutch element secured to the support, a drum rotatable upon the shaft and having a coacting clutch element, a cable to be wound upon the drum, a centrifugal governor carried by the shaft and adapted to shift the drum longitudinally thereof in one direction, a ratchet wheel secured to the shaft to rotate therewith and serving to rotate the centrifugal governor, and a pawl pivotally connected with the drum and engaging the ratchet wheel.

2. In a fire escape of the character described, a support, a shaft secured thereto, a clutch element secured to the support, a coacting clutch element loosely mounted upon the shaft, a centrifugal governor secured to the shaft to rotate therewith, a drum carrying the coacting clutch element and provided upon one end with a recess arranged adjacent the centrifugal governor, a ratchet wheel connected with the centrifugal governor to rotate it and arranged within the recess, a pawl pivotally connected with the drum within the recess and engaging the ratchet wheel, a cable to be wound upon the drum, and means to turn the drum in a direction to wind the cable thereon.

3. In a fire escape of the character described, a support, a substantially horizontal rotatable shaft carried thereby, a drum loosely mounted upon the shaft and provided at one end with a clutch element, a coacting clutch element carried by the support, a compressible coil spring arranged near one end of the drum to shift the same longitudinally in one direction to break the contact between the clutch elements, a torsional coil spring connected with the drum to turn it in one direction, a cable to be wound upon the drum by the torsional coil spring, and a centrifugal governor connected with the shaft and adapted to shift the drum in one direction to cause the clutch elements to contact.

4. In a fire escape of the character described, a support, a substantially horizontal rotatable shaft carried thereby, a drum loosely mounted upon the shaft and provided at one end with a clutch element, a coacting clutch element carried by the support, a compressible coil spring arranged near one end of the drum to shift the same longitudinally in one direction to break the contact between the clutch elements, a torsional coil spring connected with the drum to turn it in one direction, a cable to be wound upon the drum by the torsional coil spring, a centrifugal governor carried by the shaft and adapted to shift the drum in one direction to bring the clutch elements into contact, and pawl and ratchet means serving to connect the drum and centrifugal governor.

5. In a fire escape of the character described, a support, a rotatable drum carried thereby, a cable to be wound and unwound upon and from the drum, means to control the speed of rotation of the drum during its unwinding movement, and means to turn the drum in an opposite direction to wind the cable thereon including a torsional coil spring which gradually increases in thickness from its inner end toward its outer end.

In testimony whereof I affix my signature in presence of two witnesses.

MARCAL CAOUETTE.

Witnesses:
ETTA BURGHDUFF,
EARL L. CAREY.

Copies of this patent may be obtained for five cents each, by addressing the "Commissioner of Patents, Washington, D. C."